(12) United States Patent
Bachus et al.

(10) Patent No.: US 6,678,032 B1
(45) Date of Patent: Jan. 13, 2004

(54) DISPLAY DEVICE WITH ALIGNMENT MARKERS

(75) Inventors: Marcel Severijn Bruno Bachus, Cary, NC (US); Marcus Godefridus Maria Schoenmakers, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 131 days.

(21) Appl. No.: 09/787,841

(22) PCT Filed: Jul. 17, 2000

(86) PCT No.: PCT/EP00/06811

§ 371 (c)(1),
(2), (4) Date: Jul. 18, 2001

(87) PCT Pub. No.: WO01/07959

PCT Pub. Date: Feb. 1, 2001

(30) Foreign Application Priority Data

Jul. 22, 1999 (EP) .............................. 99202423

(51) Int. Cl.⁷ .......................... G02F 1/1333; G02F 1/13
(52) U.S. Cl. ....................................... 349/158; 349/187
(58) Field of Search ........................... 349/58, 149–152, 349/158, 187; 361/792

(56) References Cited

U.S. PATENT DOCUMENTS

| | | | | |
|---|---|---|---|---|
| 4,423,127 A | * | 12/1983 | Fujimura | 430/22 |
| 4,597,636 A | | 7/1986 | Hoshikawa | 350/334 |
| 5,739,887 A | * | 4/1998 | Ueda et al. | 349/149 |
| 5,768,107 A | * | 6/1998 | Ouchi et al. | 361/792 |
| 5,982,044 A | * | 11/1999 | Lin et al. | 257/797 |
| 5,982,468 A | | 11/1999 | Satou et al. | 349/150 |
| 6,081,040 A | * | 6/2000 | Okuda et al. | 257/797 |
| 6,204,509 B1 | * | 3/2001 | Yahiro et al. | 250/491.1 |
| 6,211,935 B1 | * | 4/2001 | Yamada | 349/149 |
| 6,441,504 B1 | * | 8/2002 | Glenn et al. | 257/797 |

FOREIGN PATENT DOCUMENTS

| | | | | |
|---|---|---|---|---|
| EP | 0374573 A1 | | 6/1990 | G02F/1/133 |
| JP | 09258252 | | 3/1996 | |
| JP | 10261851 | | 9/1998 | |
| JP | 2000-195962 A | * | 7/2000 | |

* cited by examiner

Primary Examiner—Tarifur R. Chowdhury
(74) Attorney, Agent, or Firm—Dicran Halajian

(57) ABSTRACT

A substrate of a display device is provided with markers which ensure accurate alignment of the display device with respect to a housing of an electronic device which includes the display device. By using e.g. V-shaped notches in the substrate edge, easy mechanical alignment with other parts of the device is obtained.

13 Claims, 3 Drawing Sheets

DISPLAY DEVICE WITH ALIGNMENT MARKERS

FIELD OF THE INVENTION

The invention relates to a display device comprising a first substrate provided with an electric conductor pattern for pixels. The invention also relates to a device provided with such a display device. The invention further relates to a method of manufacturing such a display device.

BACKGROUND OF THE INVENTION

Display devices of the type described, particularly liquid crystal display devices, are commonly used in, for example, measuring equipment but also in, for example, portable telephones. Moreover, electroluminescent display devices, based on (organic) LEDs find an increasingly wider application.

With the on-going miniaturization of electronics, it is possible to realize an increasing amount of drive electronics on the substrate. However, there is a tendency to manufacture the actual display panel (display section) as a standard component. If such a standard component is mounted by a client into an apparatus, for example, by soldering on the support (for example, a printed circuit board or another type of substrate provided with conducting (connection) tracks), or by clamping, increasingly stricter requirements are imposed on the positioning of the display panel to be provided with respect to the (further) device (mobile telephones, organizers, palmtop computers, etc.) in which the display panel is incorporated. The tolerance does not only define the accuracy with which conducting tracks of the panel and parts of the further device are aligned with each other (and hence resistance variations), but also the maximum quantity of surface which must be reserved for the display panel in the device. Since, due to the manufacturing process, the glass edges in, for example, LCD panels have an undefined edge (tolerance ±0.2 mm) in, for example, LCD panels, the display panel can no longer be introduced into the further device without special precautions when increasingly narrower contact tracks (of the order of 40 $\mu$m) are used.

SUMMARY OF THE INVENTION

It is, inter alia, an object of the present invention to provide a solution to the above-mentioned problem. To this end, a display device according to the invention is characterized in that, for aligning the conductor pattern with respect to at least a part of a device for accommodating the display device, the substrate is provided along its edge with at least a marker.

As will be further described, the marker is provided very accurately with respect to the conductor pattern. This provides the possibility of using the conductor pattern (or a related pattern such as, for example, an alignment pattern used during a part of the manufacture which is not necessarily a part of the conductor pattern) indirectly as an alignment mark in the final assembly. This has the advantage that the client does not need to use expensive equipment (for example, a so-called "vision system") for aligning the display panel with respect to the further device by means of the usually transparent (ITO) conductor pattern or further pattern. Moreover, the placement tolerance is reduced considerably and accurate straightening of the substrate edges (for example, by means of laser cutting) is not necessary.

The markers are formed as, for example, recesses (having a U-shape, a V-shape, a semi-circular shape or a trapezoidal shape) in an edge of the substrate. Alignment is then effected, for example, by abutment with a counter element in the further device comprising, for example, an optical waveguide. A preferred embodiment of a display device according to the invention is characterized in that the substrate is substantially rectangular and in that two edges of the substrate, enclosing an angle, have recesses. Fixation in the further device by fixing the panel in two directions is thereby possible.

A method of manufacturing a display device, in which an initial substrate is subjected to at least a substrate treatment in which it is provided with a pattern for realizing at least a part of the display device, whereafter the initial substrate is divided, if necessary, into a plurality of substrates of display devices for forming the display device is characterized in that, with a pattern on the substrate as alignment mark, at least one edge of the substrate of the display device is provided with a visible marker.

These and other aspects of the invention are apparent from and will be elucidated with reference to the embodiments described hereinafter.

BRIEF DESCRIPTION OF THE DRAWINGS

In the drawings:

FIG. 3 is a cross-section taken on the line III—III in FIG. 1, while

The Figures are diagrammatic and not drawn to scale. Corresponding elements are generally denoted by the same reference numerals.

DETAILED DESCRIPTION OF THE INVENTION

Figure 1:
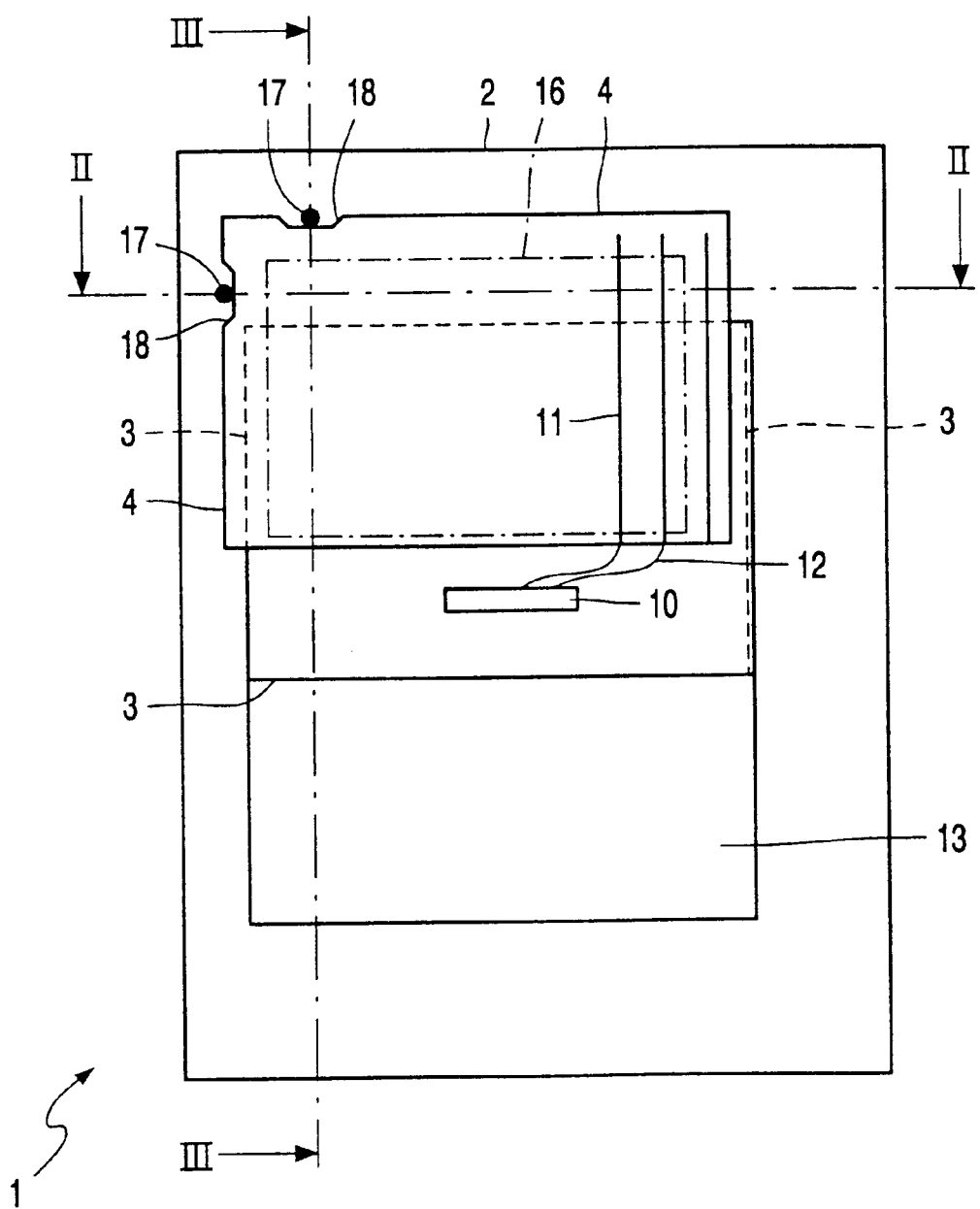
FIG. 1 is a diagrammatic plan view of a plane through a part of a device according to the invention.
Figure 2:
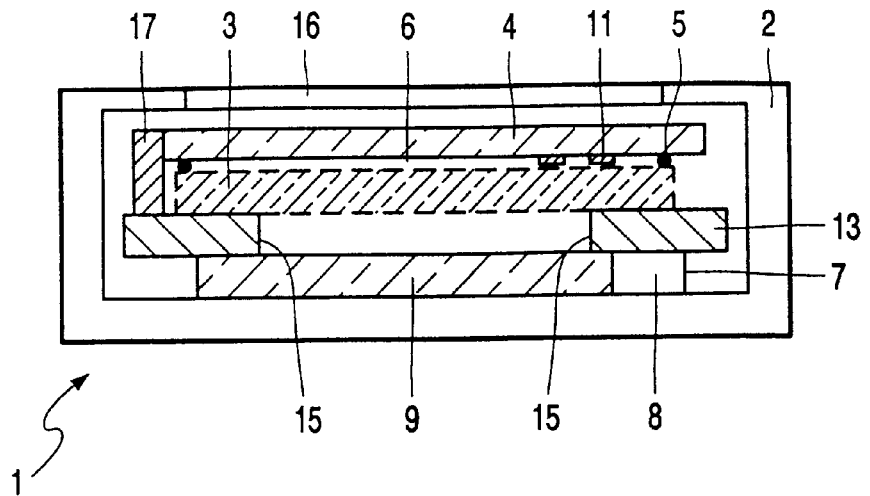
FIG. 2 is a cross-section taken on the line II—II in FIG. 1.
Figure 3:
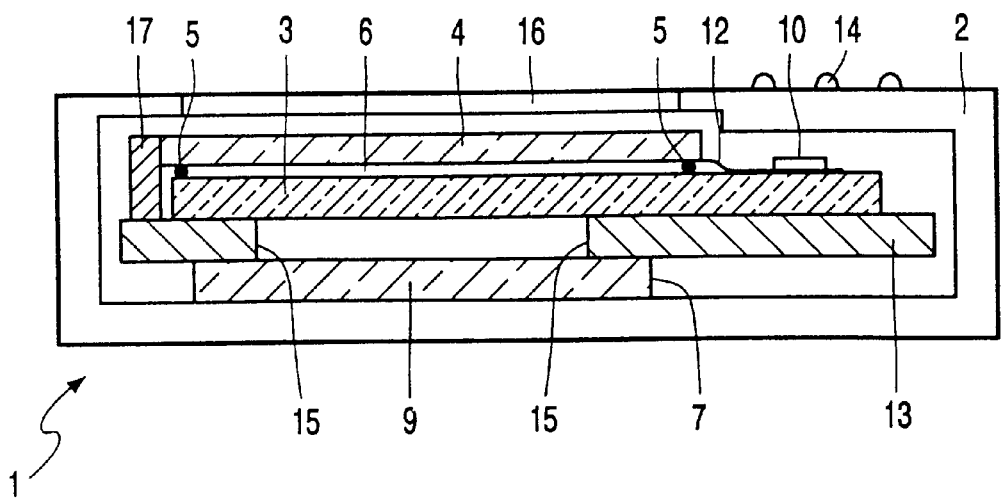

FIG. 1 is a plan view of a plane within a device 1 which is accommodated in a housing 2 (FIGS. 2, 3). The device is, for example, an electronic instrument such as a mobile telephone, or another instrument having a display function. For displaying (alphanumerical) information, the device is provided with a display device, in this example a liquid crystal display device, but a display device based on (organic) LEDs is alternatively possible. The liquid crystal display device in this example is shown in a simplified form by means of two transparent substrates 3, 4 and a sealing edge 5 between which liquid crystal material 6 is present. In this example, the liquid crystal display device is of the transmissive type. The device 1 therefore comprises a backlight 7 which is shown in a simplified form by means of a lamp 8 and a waveguide 9. If necessary, the substrate 3 is provided with one or more drive ICs 10 which provide the device with drive voltages. For example, transparent electrodes 11 on the substrate 4 are connected in a generally known manner to said IC 10 via interconnections 12. For the sake of simplicity, FIGS. 1, 2 only show two transparent electrodes 11. Further drive electronics, for example, realized on a printed circuit board 13 and other functions of the device to be operated by means of keys 14 shown diagrammatically are also omitted for the sake of simplicity. The printed circuit board 13 has an aperture 15 to pass light from the backlight 7. The housing 2 also has a window 16 at the area of the part to be displayed of the display device so as to protect it from exterior influences.

Although the housing 2 is shown as one assembly in FIGS. 2, 3, it usually consists of a plurality of parts which are secured together in the final assembly by means of adhesive, clamping or screwing connections or other connections. A critical step in the combination of the composite parts is, inter alia, the mechanical alignment of the display device (the assembly of, inter alia, the transparent substrates 3, 4, sealing edge 5, and liquid crystal material 6) or a part thereof with respect to a further part of the device 1, for example, with respect to an almost completed device, including printed circuit board 13 and backlight 7, particularly if these two parts are made at separate locations or are supplied by a plurality of suppliers. Usually, the display device is the last to be provided in the device by sliding it into a part of the housing and clamping (clicking) it into position, whereafter the housing is closed. To determine the correct location for clicking the display device into position, one of the substrates is usually moved against a counter element or alignment member 17. In, for example, LCD panels, the edges of the substrates are not accurate due to the manufacturing process (tolerance ±0.2 mm). For narrow contact tracks, such an inaccurate connection of the display panel to the other part of the device causes problems (for example, high connection resistances).

Figure 4:
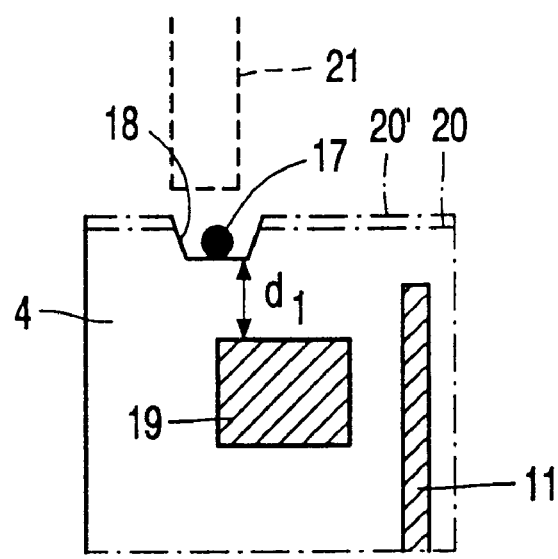
FIG. 4 is a plan view of a part of a display device according to the invention.
Figure 5:
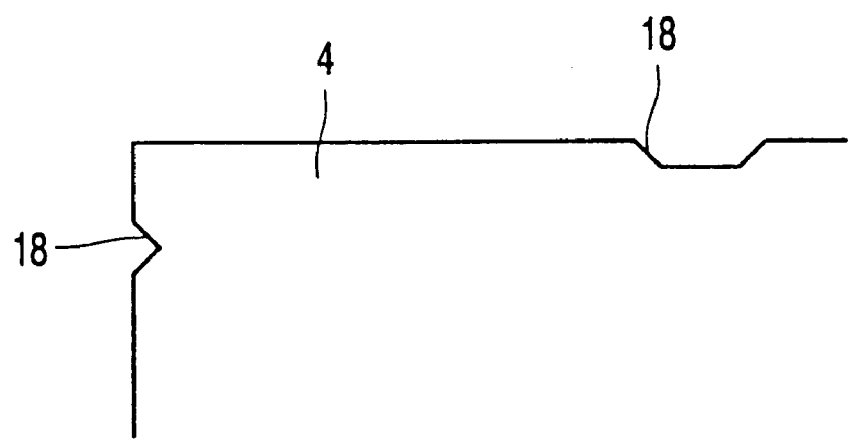
FIG. 5 shows a further variant.

According to the invention, the substrate 4 in this example has two recesses 18 which have been provided with great accuracy with respect to the wiring pattern (the transparent electrodes 11) or another alignment mark on the substrate 4. The recesses are obtained by means of milling or by means of another suitable mechanical operation (laser cutting). This mechanical operation is performed with the wiring pattern 11 as an alignment mark or an alignment mark 19 which was used during manufacture of the display device (FIG. 4). Since milling takes place with great accuracy (±50 $\mu$m), the distance $d_1$ between the alignment mark 19 and the alignment pen (the counter element 17) is defined very accurately after the display device has been clicked into position in the further device. Possible variations in the edge 20, 20' of the substrate, which may increase to approximately 0.4 mm, do not affect the position of the display section of the substrate 4 with respect to this counter element 17. The position of the transparent electrodes 11 with respect to, for example, an electrode 21 on the printed circuit board, and more particularly the position of the actual display elements with respect to an envelope, such as the housing 2, is thereby defined very accurately. For a very accurate positioning, preventing rotation of the display device, two edges of the substrate, enclosing an angle, are preferably provided with recesses as are shown in FIG. 5. In FIG. 5, the recesses have a V-shape and a trapezoidal shape, respectively, but a U-shape or a semi-circular shape is alternatively possible.

A display device is manufactured in generally known manner by subjecting a first initial substrate to a plurality of operations. The initial substrate may have a single alignment mark. After completion, a second initial substrate which has also been subjected to a plurality of operations and after providing sealing edges, these substrates are combined (in the case of LCDs) and subsequently one or more display elements are formed by means of so-called "scratching and breaking". The separate cells thus obtained are filled with the liquid crystal material before or after "scratching and breaking". Subsequently, at least an edge of the substrate of the cell is provided with a marker, with a pattern on the substrate as an alignment mark. The alignment mark may be a part of the display device, for example, a (part of a) wiring pattern 11, but also a separately provided alignment mark 19 (per cell).

To this end, one or more edges of the substrate are provided with markers such as recesses 18. As described above, mechanical alignment with respect to the further device is now possible in a very accurate way.

If desired, the marker may be alternatively an optical mark, for example, a (visible) dot which is very accurately aligned with respect to the conductor pattern of the display device. This is visually aligned with respect to, for example, an alignment mark or wiring patterns on the printed circuit board 13.

A marker (recess 18) once provided is used to advantage in further operational steps (after completion of the cell in this example) as an alignment element for further manufacturing steps such as, for example, providing polarizers, defining bond flaps, etc.

The invention is of course not limited to the examples shown, but several variations are possible within the scope of the invention. For example, the recesses 18 may also be provided in the substrate 3 in which, if necessary, the counter elements 17 have a limited height. An (organic) light-emitting device ((O)LED) may also be chosen as a display element.

In summary, the invention provides measures of arranging a display device with great accuracy in a larger assembly.

The invention resides in each and every novel characteristic feature and each and every combination of characteristic features.

What is claimed is:

1. A display device comprising a first substrate provided with an electric conductor pattern for pixels, wherein, for aligning the conductor pattern with respect to at least a part of an apparatus for accommodating the display device, the substrate is provided along a first edge with at least a first marker and along a second edge with at least a second marker; said first edge intersecting said second edge.

2. A display device as claimed in claim 1, wherein said at least first marker includes a recess.

3. A display device as claimed in claim 2, wherein the recess has a U-shape, a V-shape, a semi-circular shape or a trapezoidal shape.

4. A display device as claimed in claim 1, wherein the substrate is substantially rectangular, and wherein said at least first marker and said at least second marker include recesses.

5. An apparatus provided with the display device as claimed in claim 1, wherein the apparatus has at least an alignment element at a location of said at least marker of the substrate.

6. An apparatus provided with the display device as claimed in claim 1, wherein the apparatus has counter elements at a location of a recess of the substrate.

7. A method of manufacturing a display device comprising:
   subjecting an initial substrate to at least a substrate treatment in which said initial substrate is provided with a pattern for realizing at least a part of the display device,
   dividing the initial substrate into a plurality of substrates of display devices for forming the display device,
   with a pattern on the substrate as an alignment mark, providing a first edge of the substrate of the display device with a first marker, and providing a second edge of the substrate with a second marker; said first edge intersecting said second edge.

8. A method as claimed in claim 7, further comprising using the pattern for realizing at least a part of the display device as an alignment mark.

9. A method as claimed in claim 7, further comprising providing a recess in at least said first edge of the substrate.

10. A method as claimed in claim 9, further comprising using at least said first marker as an alignment mark in for accommodating the display device in a further device.

11. A method as claimed in claim 9, further comprising using at least said first marker as an alignment mark in the steps of manufacturing the display device.

12. A method as claimed in claim 7, further comprising providing recesses in said first edge and said second edge of the substrate, wherein the substrate is substantially rectangular.

13. A display for a device having at least two alignment members, said display comprising a substrate having a pattern with at least two intersecting edges that form a corner; wherein each of said at least two intersecting edges has a recess substantially near said corner; said recess of each of said at least two intersecting edges abutting against a respective one of said at least two alignment members for aligning said display in said device.

* * * * *